United States Patent [19]

Yin

[11] 4,345,153

[45] Aug. 17, 1982

[54] LOW INTENSITY X-RAY AND GAMMA-RAY SPECTROMETER

[75] Inventor: Lo I. Yin, Silver Spring, Md.

[73] Assignee: The United States of America as represented by the Administrator of the National Aeronautics and Space Administration, Washington, D.C.

[21] Appl. No.: 173,524

[22] Filed: Jul. 30, 1980

[51] Int. Cl.³ .............................................. G01T 1/20
[52] U.S. Cl. ................................................ 250/369
[58] Field of Search ................. 250/363 R, 363 S, 368, 250/369, 361 R, 362

[56] References Cited

U.S. PATENT DOCUMENTS 4,142,101  2/1979  Yin ................................... 250/363 R
4,272,678  6/1981  Lange ............................. 250/368 X

OTHER PUBLICATIONS

Lecomte et al., "Channel Electron Multipliers: Properties, Development and Applications," IEEE Trans. on Nuclear Science, vol. NS-25, No. 2, Apr. 1978, pp. 964-973.

Primary Examiner—Davis L. Willis
Attorney, Agent, or Firm—John O. Tresansky; John R. Manning; Ronald F. Sandler

[57] ABSTRACT

A low intensity X-ray and gamma-ray spectrometer 10 is disclosed for imaging, counting, and energy resolving of single invisible radiation particles. Spectrometer 10 includes a converting device 20 for converting single invisible radiation particles to visible light photons. Another converting device 24 converts the visible light photons to photoelectrons. A fiber optics coupling device 22 couples together converting devices 20 and 24. An intensifying device 26 intensifies the photoelectrons by an average gain factor of substantially $10^4$–$10^7$. Intensifying device 26 is an anti-ion feedback microchannel plate amplifier which is operated substantially below saturation. A displaying device 32 displays the intensified photoelectrons. Displaying device 32 indicates the spatial position, number, and energy of the incoming single invisible radiation particles.

33 Claims, 8 Drawing Figures

LOW INTENSITY X-RAY AND GAMMA-RAY SPECTROMETER

ORIGIN OF THE INVENTION

The invention described herein was made by an employee of the U.S. Government and may be manufactured and used by or for the Government for governmental purposes without the payment of royalties thereon or therefor.

DESCRIPTION

1. Technical Field

The invention generally relates to X-ray and gamma-ray spectrometers and more particularly to low intensity X-ray and gamma-ray spectrometers for displaying the position, number, and energy of incoming single X-ray and gamma-ray particles.

In the field of spectrometry and, particularly, in the detection of low intensity single X-ray and gamma-ray photons in the 20 keV to 200 keV region, as is found in outer space, it is of particular interest to scientists to determine not only the intensity and energy of single X-ray and gamma-ray photons but also their spatial positions. By observing the spatial position of incoming radiation through suitable apertures analogous to an optical lens system, scientists can pin point where these X-rays and gamma-rays originate on extra-terrestrial bodies such as the stars, black holes, quasars, neutron stars, and the like.

In addition to astronomical uses, a spectrometer that images, counts and determines energy of incoming radiation would be extremely useful in applications where low flux applications are advantageous such as in the research, industrial, and medical fields.

2. Background Art

There is a need for spectrometers capable of simultaneously counting, imaging, and energy resolving low flux X-ray and gamma-ray photons in the 20 keV to 200 keV region.

Recent development in detector technology has resulted in X-ray and gamma-ray spectrometers with high energy resolution. However, most of these spectrometers do not have imaging capabilities. In the context of the invention, imaging means that the spatial positional information of the incident X-ray or gamma-ray photon is preserved in the detector plane. In a generically related art, the existing imaging spectrometer uses a large scintillation crystal, such as NaI(T1), with many photomultiplier tubes in parallel. Such a system is by nature bulky, complicated, with poor spatial resolution and not well suited for space astronomy.

A low intensity X-ray and gamma-ray imaging device is fully disclosed in U.S. Pat. No. 4,142,101. Although this imaging device produces extraordinarily clear images of low flux radiation, while being relatively compact and low in cost, it cannot count the number of single X-ray and gamma-ray photons entering the device, nor can it determine the energy of the single X-ray and gamma-ray photons. The patented imaging device utilizes a scintillator or phosphor material to convert the incident X-ray or gamma-ray image into a visible-light image. This visible-light image is then intensified by an image intensifier tube containing a microchannel plate (MCP) electron multiplier. In the image intensifier, the visible-light image from the scintillator is first converted into an electron image by a photocathode. The photo-electrons from the photocathode are then multiplied by the MCP with a gain of $10^2$–$10^3$. The output electrons from the MCP are then accelerated to strike a phosphor screen which converts them into an intensified visible-light image for direct viewing. However, an electron gain of $10^2$–$10^3$ is insufficient for either single-photon counting or energy determination. The obvious solution to the above problem is to operate the single MCP where the gain is increased to the point where single photon detection is possible. However, such operation of the single MCP amplifier causes the formation of ions at the output from the residue gas in the evacuated chamber. These ions are accelerated back through the straight channels of the MCP amplifier to strike the photocathode or the input wall which can initiate another electron multiplication chain. This ion feedback is detrimental to the system because it degrades the photocathode, causes after-pulses and free oscillations.

To counteract the ion feedback problem, MCP amplifiers having curved channels or single MCP amplifiers placed together in a chevron configuration are used. The curved channels or multiple MCP's prevent the ions from reaching the input. The next logical step is to run the curved channel or multiple MCP amplifier to saturation to obtain the proper gain necessary for single photon detection.

When a MCP amplifier is operated below saturation the gain experienced by each photoelectron is an average gain value of $10^2$–$10^3$ so that some photoelectrons have a gain less than $10^2$–$10^3$ while others have a gain of more than $10^2$–$10^3$. The gain distribution curve is exponential in shape with a large number of photoelectrons having a very low gain. With multiple MCP's, as the MCP amplifier gain capacity is increased to saturation the gain curve changes to a Gaussian-shaped curve with a mean gain of about $10^6$–$10^7$ with only a small fraction of photoelectrons having a gain less than or greater than the mean value, thus decreasing significantly the variance of the gain distribution. Consequently it becomes possible to use the MCP to count single photoelectrons in the gain-saturated mode. However, it is important to point out that for each absorbed X-ray or gamma-ray photon, thousands of visible-light photons are produced in the scintillator because of its high energy. In fact, the number of visible-light photons is proportional to the energy of the X-ray or gamma-ray photon. Assuming a quantum efficiency of 10–30%, this large number of visible-light photons in turn produces a comparably large number of photoelectrons at the photocathode within the decay time of the scintillator. When these "simultaneous" photoelectrons enter the MCP, ideally the output pulse height of the MCP operated in the saturated mode should be that of a single photoelectron multiplied by the number of simultaneous photoelectrons. Thus, ideally, the MCP output charge or pulse height should also be proportional to the energy of the incident X-ray or gamma-ray, providing energy-resolving as well as single-photon counting capabilities. Unfortunately, this does not occur. Because the MCP amplifier is operated at saturation so that the proper gain is obtained for photoelectron counting, a single photoelectron will have a gain of about $10^6$–$10^7$. However, all simultaneous photoelectrons will also have a gain of $10^6$–$10^7$ because the MCP amplifier cannot produce any higher gain. Thus, the detectors will be unable to distinguish the number of simultaneous photoelectrons, resulting in a loss of proportionality between output pulse height and incident X-ray or gamma-ray energy.

STATEMENT OF INVENTION

Accordingly, one object of the invention is to provide a new and improved low intensity spectrometer.

Another object of this invention is to provide a spectrometer which counts, images, and energy resolves single low intensity radiation particles.

Still another object of this invention is to provide a spectrometer which counts, images, and energy resolves single low intensity X-ray and gamma-ray photons.

A further object of this invention is to provide a spectrometer which counts, images, and energy resolves single low intensity X-ray and gamma-ray photons and is compact, light weight, and low in cost.

A still further object of this invention is to provide a method of counting, imaging, and energy resolving single low intensity X-ray and gamma-ray photons.

Briefly, these and other objects are obtained by an apparatus having a converting device which converts the invisible radiation to visible light and another converting device which converts the visible light to photoelectrons. A light coupling device connects each of the converting devices so that the spatial position of the invisible radiation particle is maintained. An intensifying device multiplies the photoelectrons by an average gain factor of about $10^4$–$10^7$. The intensifying device is an anti-ion feedback microchannel plate multiplier operated far below saturation. A display device receives the amplified electrons and displays the spatial position, number, energy, of the single invisible radiation particle.

Other objects, features, and advantages of the invention will be apparent from the following detailed description of the invention taken in conjunction with the accompanying drawings.

BRIEF DESCRIPTION OF THE DRAWINGS

In the drawings like parts are designated by the same references in the figures, wherein.

DETAILED DESCRIPTION OF THE INVENTION

Figure 1:
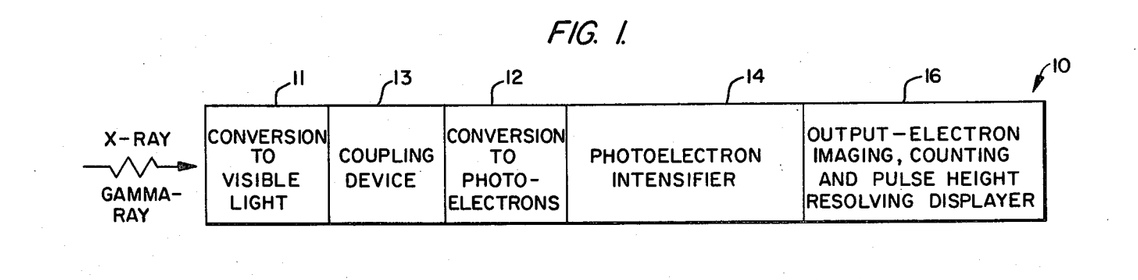
FIG. 1 is a block diagram of the invention illustrating the basic system concept of the invention.

Referring to FIG. 1, the low intensity X-ray and gamma-ray spectrometer, generally designated by numeral 10, includes a converter section 11 for converting single invisible radiation particles to visible light photons. Another converting section 12 converts the visible light photons to photoelectrons. A coupling section 13 interconnects the converter sections for maintaining the spatial positions of the visible-light photons produced by the single invisible radiation particle. An intensifying section 14 intensifies the photoelectrons by an average gain factor of substantially $10^4$–$10^7$. The intensifying section is an anti-ion-feedback microchannel plate electron multiplier which is operated far below saturation. A display section 16 displays the intensified photoelectron image and indicates the spatial position, number, and energy of the impinging single invisible radiation particles.

Figure 2:
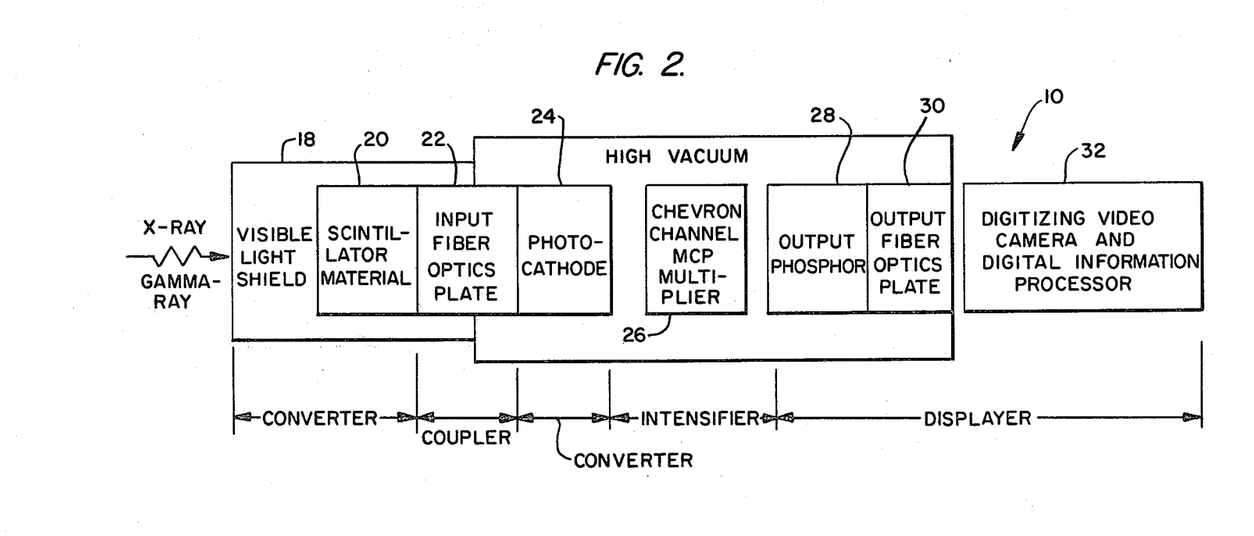
FIG. 2 is a block diagrammatic view illustrating the functional elements of the preferred embodiment of the invention.

FIG. 2 illustrates the major functional elements of the overall combination of the preferred embodiment of the low intensity X-ray and gamma-ray spectrometer 10. A visible light shield 18 functions to block ambient visible light while providing virtually no shielding for X-ray or gamma-ray photons. The X-ray or gamma-ray photons which impinge on the visible light shield pass through and strike a layer of scintillator material 20 which, in turn, generates visible light. Elements 18 and 20 constitute converter section 11. An input fiber optics plate 22 maintains the spatial position of the incoming visible light from the scintillator material and transmits the visible light to a photocathode 24. The input fiber optics plate 22 constitutes coupling section 13. The photocathode converts the visible light photons to photoelectrons which, in turn, are multiplied by a chevron microchannel-plate electron multiplier 26. The photocathode constitutes converter section 12 and the MCP multiplier is intensifier section 14. The electron output of the MCP is thereafter converted back to visible light by an aluminized output phosphor layer 28. The visible light is transported in the same spatial position as received from the output phosphor layer by an output fiber optics plate 30 to be viewed directly, or to be recorded by a digitizing video camera and associated digital information processor 32 which displays the spatial position, number and energy of the invisible radiation particles. Elements 28, 30, and 32 constitute display section 16.

Figure 3:
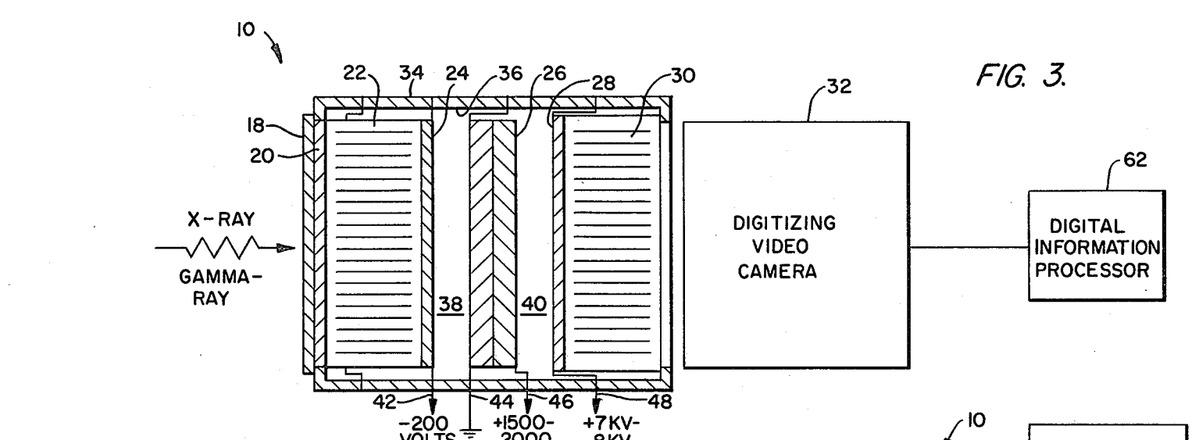
FIG. 3 is a partial cross-sectional view taken along the major axis of the preferred embodiment of FIG. 2 and partial block diagrammatic view.

The preferred embodiment functionally described in FIG. 2 is illustrated in detail in FIG. 3. The elements 22–30 are contained within a housing 34 which may be cylindrical and formed of any compatible ceramic, glass or other insulating material suitable for electrical insulation and vacuum isolation. An incoming single radiation particle, which may be an X-ray photon, gamma-ray photon, charged particle, or neutral particle, impinges on light shield 18. The light shield may be a thin layer of beryllium. The beryllium is opaque to ambient visible light thereby blocking the visible light from striking the scintillator material but, in turn, is transparent to X-ray and gamma-ray photons. In addition, the beryllium will prevent contamination from reaching the scintillator material which can degrade its converting abilities. Although beryllium is preferred, any material highly opaque to visible light and transparent to X-ray and gamma-ray photons may be used such as aluminum or magnesium.

Scintillator material 20 converts the relatively high energy single radiation particle to a large number of individual low energy visible-light photons. The number of visible-light photons produced by the scintillator material is directly proportional to the energy of the X-ray or gamma-ray photon, therefore, energy information is preserved. For X-ray and gamma-ray photon conversion, scintillator materials may be used such as activated sodium iodide (NaI). The scintillator material is preferably in the form of thin slabs or fibers in direct contact with input fiber optics face plate 22. Thus, the scintillator is fully protected by the visible light shield and the fiber optics face plate from contamination. For dosimetry studies, where the incident radiation may be charged or neutral particles, plastic scintillators may be used as converters because of their tissue-equivalent properties. When individual radiation particles are absorbed by the scintillator material a bundle of many thousands of visible-light photons are produced which have a tendency to spread out within the scintillator material. However, by virtue of the thinness or fiber configuration of the scintillator material the lateral spread is made minimal and thereby preserving, to a large extent, the position of the striking radiation particle. Thus, it is desirable to make the scintillator material as thin as possible and still have substantial absorption of the incident radiation particles. It has been found that scintillator material such as CsI having a thickness of 1.0 mm will provide 100% detection efficiency for photon energies below 60 keV, 60% at 100 keV, 28% at 150 keV, and 16% at 200 keV.

The visible-light bundles from scintillator material 20 are piped into the high vacuum chamber 36 by input fiber optics face plate 22 which includes a plurality of parallel fibers of 5 $\mu$m diameter. The fiber size should be small enough so that system resolution degradation is minimal. The fiber optics plate thickness is not critical, but the ability to employ a thick plate without affecting operating characteristics gives the capability of a rugged device. Loss of resolution is typically minimal due to the direct coupling between the input fiber optics face plate and the scintillator material.

On the back face, i.e., vacuum side, of input fiber optics face plate 22, is deposited a visible-light photocathode 24 whose material, for instance, S-20, is chosen to closely match the output wavelength of scintillator material 20. The bundle of visible-light photons that emerge from the fiber optic light pipes is converted to a bundle of photoelectrons by the photocathode. Again the number of photoelectrons produced by the photocathode is directly proportional to the number of visible light photons striking the photocathode and, therefore, the number of photoelectrons produced is proportional to the energy of the striking X-ray or gamma-ray photon. The photoelectrons are accelerated by approximately 200 volts across a gap 38 of about 0.2 mm to the input of a chevron type microchannel plate amplifier 26. Because of the close proximity between the photocathode and the input side of the chevron MCP amplifier and the high electric field experienced by the photoelectrons, the spatial position of the photoelectrons emerging from the photocathode is maintained.

To achieve low noise operation and to prevent the contamination of the photocathode, the large surface area of chevron MCP amplifier 26 with its millions of microchannels is thoroughly outgassed prior to the sealing of intensifier section 14 in a high vacuum of substantially $10^{-9}$ torr. An extremely thin film of oxide may also be deposited upon the large input surface area of the MCP to further enhance low noise operation and reduce photocathode contamination. With an oxide coated MCP it is necessary to increase the potential difference across gap 38 in order to provide the photoelectrons with sufficient kenetic energy to penetrate the oxide film and be detected and multiplied by the MCP.

The intensifier chosen in the preferred embodiment includes a pair of single MCP amplifiers stacked together so that the individual microchannels of each MCP amplifier forms an angle where they intersect. Thus, these type MCP amplifiers are characterized by a chevron configuration. The chevron MCP amplifier 26 is constructed with 12 $\mu$m inside diameter channels and the combined length to diameter ratio of the chevron microchannel is approximately 100:1. The chevron configuration of each of the microchannels prevents ion feedback thereby enabling the MCP amplifier to operate in the high gain mode without degrading the operation of photocathode 24.

The chevron MCP amplifier 26 is operated with 1500 to 2000 volts at a level substantially below saturation which will achieve an average amplification gain of $10^4$ to $10^7$ which is necessary to count individual X-ray or gamma-ray photon strikes and at the same time ensure that photoelectrons entering simultaneously into the chevron MCP amplifier do not give rise to saturated output pulse heights. The explanation for the chevron MCP amplifier operating in the above described unexpected manner rather than operating with the expected single MCP average gain of $10^2-10^3$, which is too low to detect individual X-ray or gamma-ray photons, or at a saturated gain of $10^6-10^7$, is believed to be the following.

The gain for single photoelectron inputs in the chevron MCP amplifier 26 can be driven to saturation resulting in a Gaussian-shaped pulse height distribution with a mean gain of $10^6$ to $10^7$. Such a saturation gain distribution greatly decreases the gain variance in the individual microchannels as well as among many microchannels. Thus, in principle, in the gain saturated mode the chevron MCP amplifier output can be made proportional to the number of simultaneous input electrons. Indeed, it has been shown with intense visible light that the output pulse height is proportional to single, double, triple, etc. photoelectron inputs. In this case, the multiple photoelectrons which simultaneously trigger microchannels are randomly distributed in location across the input face of the MCP. However, in the case of X-ray and gamma-ray photons, the situation is markedly different in two aspects. First the number of simultaneous photoelectrons released by a single X-ray or gamma-ray photon is likely to be in the hundreds rather than two or three. Second these simultaneous photoelectrons are not spread out randomly across the MCP but rather concentrated in a small region immediately adjacent to each other near the location where the incident X-ray or gamma-ray photon is absorbed. In fact, to achieve good spatial resolution, it is desirable to make this region as small as possible. Thus, many single channels in the MCP will be accepting photoelectrons simultaneously and some will be accepting multiple photoelectrons as well. Because in the gain-saturated mode the charge output of the single microchannel is clamped at the saturated value of $10^6-10^7$, the proportionality between output pulse height and input number will be severely degraded in such cases, causing corresponding degradation in energy resolution. Furthermore, due to the inherently high resistivity and small diameter of the microchannels, the total charge deliverable by the MCP in each single pulse is also limited. Thus, a gain-saturated mode is not suitable for energy resolution of X-ray or gamma-ray photons.

Figure 4:
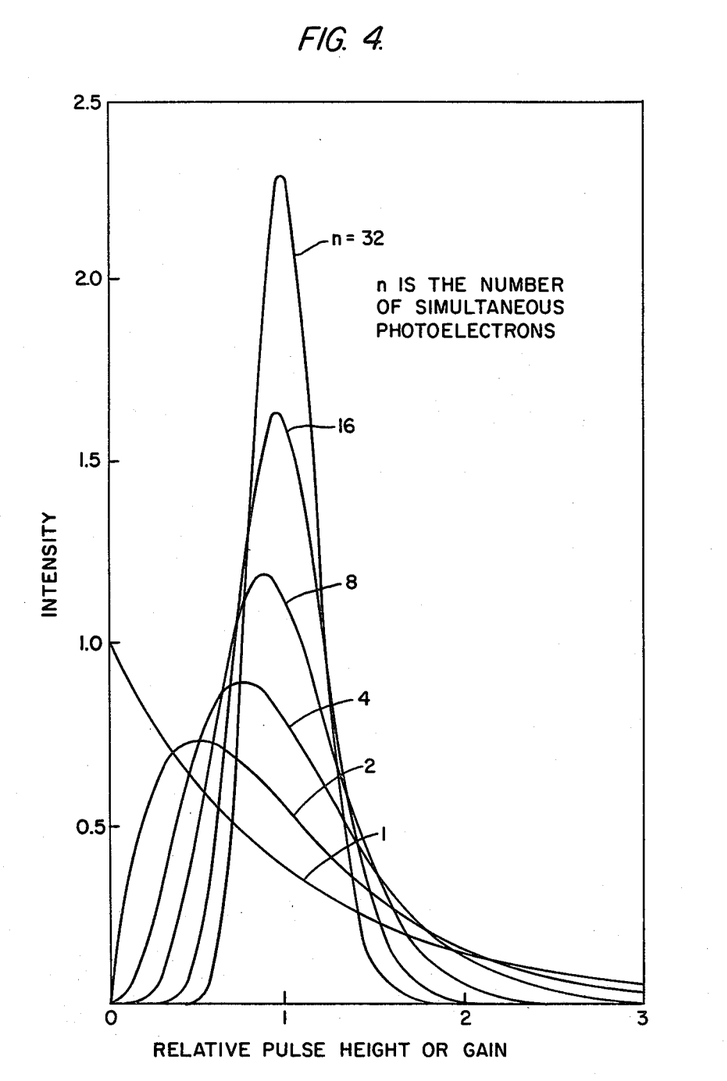
FIG. 4 is a graph illustrating the change in pulse-height or gain distribution as the number n of simultaneous photoelectrons entering the microchannel plate increases. The curves are normalized to unit area and mean gain.

Referring to FIG. 4, when the chevron MCP amplifier 26 is operated far from gain saturation, for single-photoelectron inputs, the gain distribution curve is exponential (Poisson) in shape as is indicated by curve n=1 where n is the number of photoelectrons that enter the MCP amplifier. Such a gain distribution is a consequence of the statistical fluctuations in the photoelectron multiplication process within each microchannel as well as from microchannel to microchannel. However, photoelectrons entering the chevron MCP amplifier simultaneously will take on a gain distribution curve that is more Gaussian in shape than Poisson. When the number of simultaneous input photoelectrons (n) increases, the normalized gain distribution becomes more and more Gaussian, such as where the number of simultaneous photoelectrons (n) equals 2, 4, and 8. When the number of simultaneous photoelectrons (n) is greater than 10, such as 16 and 32, the gain distribution curves have the same Gaussian characteristics as if the chevron MCP amplifier is operated in the saturated mode. Furthermore, as the number of simultaneous photoelectrons increase, the relative pulse height peaking of each of the Gaussian gain distribution curves will be increased relative to a lower number of simultaneous photoelectrons. Because each X-ray or gamma-ray photon strike will create hundreds or thousands of simultaneous photoelectrons, the total gain of the bundle of simultaneous electrons will be sufficiently high to allow individual X-ray or gamma-ray photon counting even when the MCP's are operated far below saturation. Energy resolution will be obtainable because the peaked pulse height of the Gaussian-like curves are proportional to the number of simultaneous photoelectrons entering the chevron MCP amplifier. This action of the simultaneous photoelectrons applies whether the input photoelectrons are spread over a large number of microchannels or concentrated in one microchannel or a combination of both. Because the vast majority of signals are due to simultaneous photoelectrons and thus give rise to large pulses, noise pulses due to single photoelectrons can be easily rejected. Furthermore, because the pulse height of the intensified electrons is proportional to the number of incoming simultaneous photoelectrons the pulse height will be proportional to the energy of the X-ray and gamma-ray photon.

Referring to FIG. 3, the intensified electrons emerging from chevron MCP amplifier 26 are accelerated across a gap 40 at a relative potential of 5 to 6 kilovolts. Gap 40 is preferably about 1.3 mm to preserve the spatial position of the photoelectrons. The output electrons from the MCP impinge on an aluminized phosphor screen 28, which is deposited as a layer on output fiber optic face plate 30. The aluminized phosphor prevents visible light feed back to photocathode 24. The output phosphor can be any which emits visible light, such as P-20, with wave-length and decay characteristics matched to a particular application. The number of visible-light photons, i.e., the brightness, produced by the output phosphor screen is proportional to the number of striking electrons, and, therefore, the proportionality with the energy of the X-ray or gamma-ray photon is maintained. Output fiber optics plate 30 serves as a light pipe and maintains the visible light spatial position.

Both input and output fiber optics face plates 22 and 30 serve as the vacuum seals on housing 34 to maintain the high vacuum within the tube. It should be noted that the housing contains photocathode 24, chevron MCP amplifier 26, and output phosphor layer 28 in a high vacuum and light shield 18 and scintillator material 20 covers the radiation input end of the housing. Pins 42, 44, 46, and 48 protrude from the housing to provide access to a power supply (to be explained later) for spectrometer 10. Typically, the photocathode is at −200 volts, or higher if an oxide-coated MCP is used, the input to the chevron MCP amplifier is grounded, the output of the chevron MCP amplifier is between 1500 and 2000 volts, and the output phosphor layer is between 7 and 8 kilovolts. The device can be operated with reference to other grounds as long as the relative potential differences between the components are kept the same.

The visible light emerging from output fiber optics plate 30 contains the imaging, number, and energy resolution information in analog form. This image can be viewed directly. However, to properly analyze the supplied information, the visible-light output is digitized and recorded by any conventional digitizing video camera 32 such as EMR Optical Data Digitizer 658, EMR Photoelectric, Princeton, N.J. The digitizing video camera will record the spatial position and brightness of and the incoming X-ray or gamma-ray photons. At low incident X-ray or gamma-ray flux levels where the probability of two X-ray or gamma-ray photons striking the same picture element is negligible during the integration time of the video camera, energy analysis can also be performed. This is accomplished by analyzing the brightness or intensity of the digitized video signal at each position by means of a conventional digital information processor 62.

Figure 5:
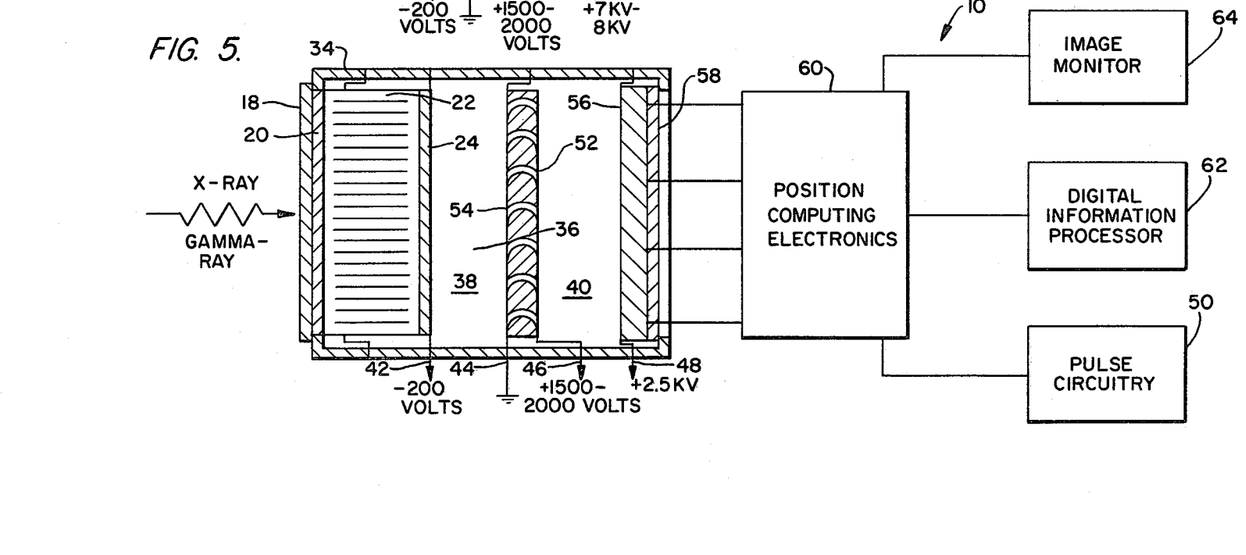
FIG. 5 is an alternative embodiment in partial cross-section and partial block diagrammatic view of the preferred embodiment of FIG. 3.

Another and even more preferable embodiment of spectrometer 10 is illustrated in FIG. 5 wherein housing 34, shield 18, scintillator material 20, input fiber optics plate 22, photocathode 24, vacuum chamber 36, gaps 38 and 40, and pins 42, 44, 46, and 48 are the same as previously described. For illustrative purposes, instead of using chevron MCP amplifier 26, a single MCP amplifier 52 having curved microchannels 54 is used. The microchannels are curved to prevent ion feedback. To produce the desired amplification gain the microchannels should have a length to diameter ratio of about 100:1. Again MCP amplifier 52 is operated far below saturation to provide for proper pulse height resolution. However, instead of using phosphor screen 28 and output fiber optics plate 30 to produce the proper output signals, in this embodiment a conventional digitizing position sensing anode 56 may be used. A face plate 58 seals the position sensing anode within vacuum chamber 36. Position sensing anode 56 may be a resistive anode, cross grid anode, or quadrant anode. The position sensing anode is connected to position computing electronics 60. The position sensing anode and its associated position computing electronics may be purchased from Surface Science Laboratory, 4151 Middlefield Rd., Palo Alto, Calif. 94303. The position computing electronics is connected to any conventional digital information processor 62 as a IEEE Standard 583–1975 CAMAC system controlled by a NOVA computer manufactured by Data General Corp., Westboro, Mass. In this embodiment, the voltage between MCP output and resistive anode need be only in the order of 0.5 kV instead of the 6 to 7 kV needed for the phosphor screen.

Pulse circuitry 50 is coupled to the position computing electronics for analysis of the output pulse height resulting from the simultaneous photoelectrons at the MCP input. For visual observation, an image monitor 64 is coupled to the position computing electronics. The image monitor can be any conventional storage oscillosope.

Furthermore, it is important to note that in this embodiment, because the position computing electronics essentially computes the centroid of the charge pulse incident on the resistive anode, it also serves to improve the spatial resolution of the input scintillator. That is, where there is lateral spread of visible light in the scintillator, by locating the centroid of the spread, a more precise determination of spatial coordinates is made possible. This provides improved spatial resolution for a given scintillator thickness, or alternatively, allows the use of a thicker scintillator at a given spatial resolution thereby providing higher detection efficiency. In fact, this is the same principle which is being used in conventional gamma cameras as invented by H. O. Anger.

Figure 6:
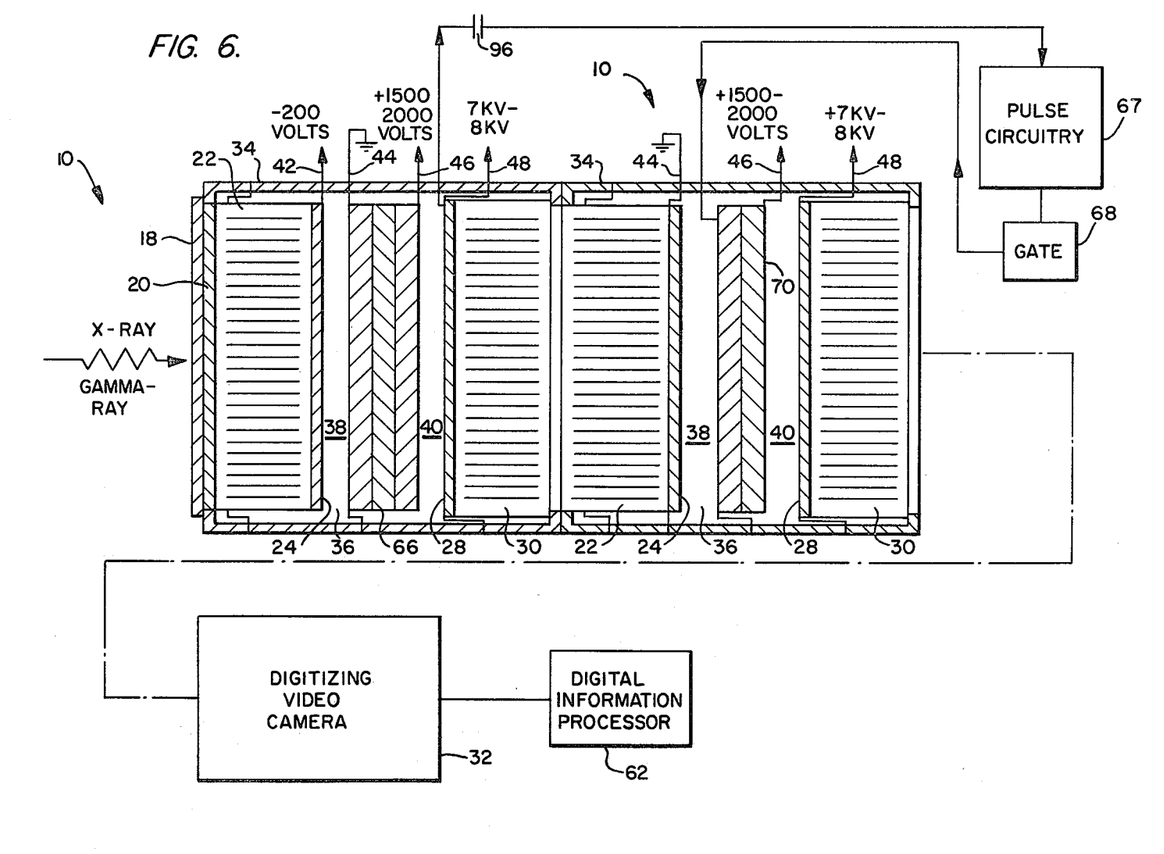
FIG. 6 is another alternative embodiment in partial cross-section and partial block diagrammatic view of the preferred embodiment of FIG. 3.

Referring to FIG. 6, another embodiment of spectrometer 10 is illustrated. The embodiment shown in FIG. 6 is a two stage device which will image, count, and resolve energies at pre-selected X-ray or gamma-ray photon energies. The first stage is a spectrometer which is identical to that of FIG. 3 except that the chevron MCP amplifier 26 is replaced, for illustrative purposes, with a Z configuration MCP amplifier 66. The Z MCP amplifier includes three single MCP amplifiers stacked together so that their combined microchannels form a Z configuration. Preferably, the microchannel length to diameter ratio is substantially 120:1. Again the Z MCP amplifier is operated far below saturation so that the pulse height of the simultaneous photoelectrons will be proportional to incident particle energy.

The second stage is a second spectrometer 10 coupled to the output fiber optics plate 30 of the first stage. The second stage does not include shield 18 or scintillator material 20 because the entering radiation will already be visible light. The MCP amplifier 70 for the second stage may be either the single curved MCP amplifier 52, chevron MCP amplifier 26, or Z MCP amplifier 66. Another pulse circuitry 67 (as will be disclosed) is connected to the aluminized output phosphor layer 28 in the first stage and a gate 68 is connected between pulse circuitry 67 and MCP amplifier 70 of the second stage. In operation, pulse circuitry 67 is set for the selected energy band that is desired to be analyzed. Normally, gate 68 will maintain the input of MCP amplifier 70 negative with respect to photocathode 24 of the second stage. With a negative MCP amplifier input, the photoelectrons will be repelled back to the photocathode, cutting off the second stage. When pulse circuitry 67 senses, through capacitor 96, charged pulses of the proper pulse height, i.e., the proper energy on the aluminized output phosphor layer 28 of the first stage, gate 68 will allow the input of MCP amplifier 70 to go to a positive potential which allows MCP amplifier 70 to amplify the photoelectrons at the second stage. Thus the image at the output of the second stage is formed only by X-ray or gamma-ray photons at the selected energy. This visible-light output image can be viewed directly or alternatively, stored or analyzed by digitizing video camera 32 and processor 62.

Although the above three embodiments are described in their preferred construction, it should be understood that the three described MCP amplifiers; i.e., curved MCP amplifier 52, chevron MCP amplifiers 26 and 70, and Z MCP amplifier 66, may be interchanged in all three embodiments without effecting their operation.

Furthermore, inverter image intensifier tubes which contain an electrostatic focussing lens between the photocathode and MCP input can be substituted for the proximity-focussed intensifier tubes depicted in FIGS. 2, 3, 5 and 6 without affecting the operation of the invention. In addition, the microchannel plates may consist of microchannels that have conical inputs.

Figure 7:
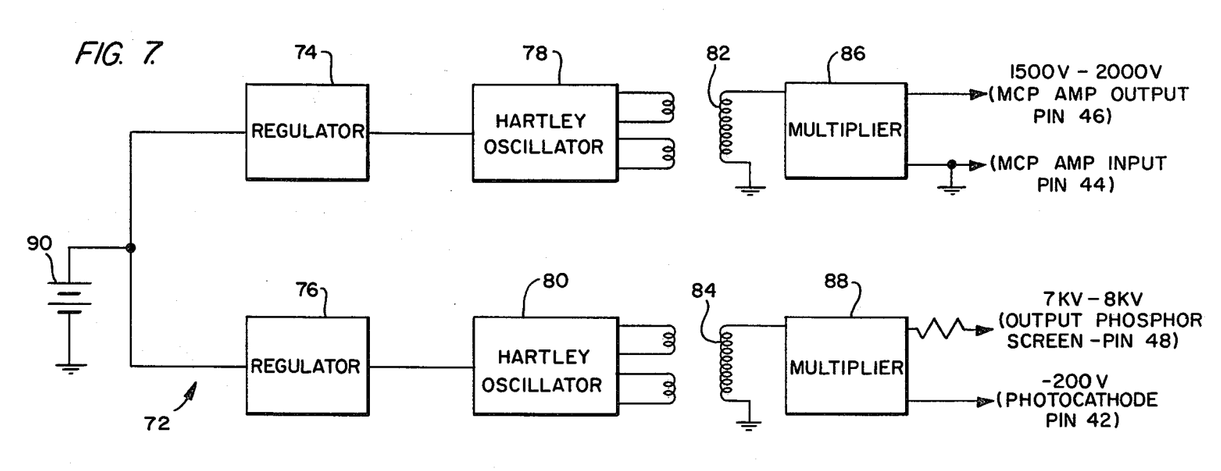
FIG. 7 is a block diagram of a power supply for the invention.

A power supply 72 for supplying the various voltages to spectrometer 10 is shown in FIG. 7. There are two drive chains consisting of regulators 74 and 76, Hartley oscillators 78 and 80, step up transformers 82 and 84, and multipliers 86 and 88. Power supply 72 may be powered by a 2.0 to 9.0 volt source 90. When the position sensing anode is used, the anode voltage can be much lower than that required for a phosphor screen.

Figure 8:
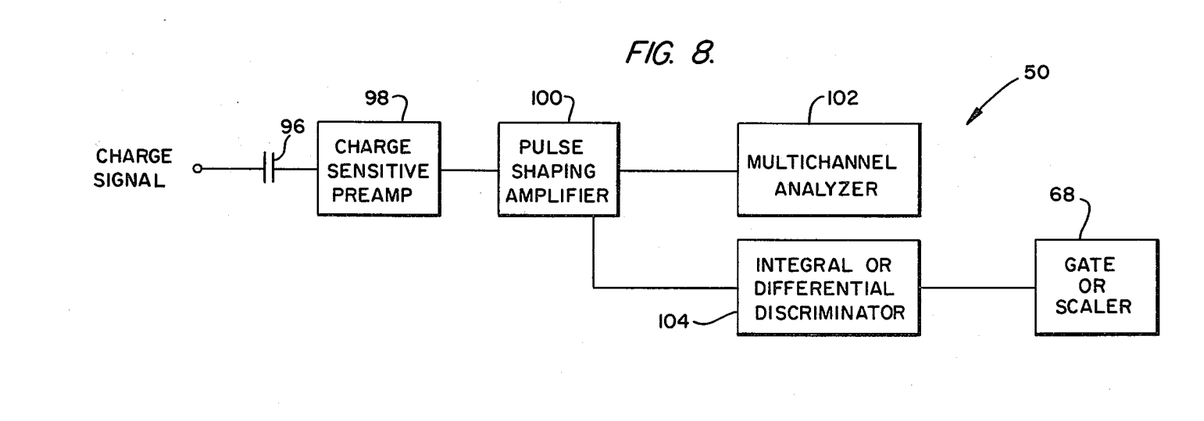
FIG. 8 is a block diagram of the pulse circuitry used in conjunction with the output displayer.

Typical pulse circuitry 50 for the various embodiments is illustrated in FIG. 8. The charge signal from the anode is coupled by capacitor 96 to a charge sensitive preamplifier 98. The charge signal is then shaped and amplified by a pulse shaping amplifier 100. The amplified signal is then fed to a multichannel analyzer 102 which analyzes the height of the charged pulse from the anode and thus resolving the energy of the incoming radiation particles. When pulse circuitry 67 is used in the two stage embodiment, the charge signal from pulse shaping amplifier 100 is also fed to an integral or differential discriminator 104 which only allows charge signals of a specified energy to be inputed to a gate 68. When a charge signal having an energy above a certain threshold is to be sent to gate 68 an integral discriminator is used. When a charge signal having an energy between a low and high threshold is to be sent to gate 68 a differential discriminator is used.

A small, rugged, imaging, counting, and energy resolving spectrometer of single X-ray or gamma-ray photons has been disclosed. By the use of a curved, chevron, or Z microchannel plate amplifier the problem of ion feedback is eliminated. By operating the MCP amplifier far below saturation, the spectrometer utilizes the high gain capability of the MCP amplifier while taking advantage of the Gaussian gain characteristics as a result of large numbers of simultaneous photoelectrons for maintaining the pulse height proportionality between the energy of the incoming radiation and the number of simultaneous photoelectrons. The present invention describes a unique imaging spectrometer for X-rays and gamma-rays in the 20–200 keV region which is simple and compact, with high spatial resolution in the order of 0.2 mm, and energy resolution comparable to that of scintillation crystal and photomultiplier tube systems. In effect, the invention functions as hundreds of scintillator and photomultiplier tubes operating in parallel yet with the actual size no larger than a single commonly used scintillator and photomultiplier detector system. In one embodiment of the invention, it is possible to view in real time an X-ray or gamma-ray image at pre-selected energies.

Obvious modifications and variations of the low intensity X-ray or gamma-ray spectrometer are possible in light of the above teachings. It is to be understood, therefore, that within the scope of the appended claims the spectrometer may be practiced otherwise than as specifically disclosed.

Accordingly, the invention having been disclosed in its best embodiment and mode of operation, that which is desired to be claimed by Letters Patent is:

1. Apparatus for imaging, counting, and energy resolving of single invisible radiation particles comprising:

means for converting said invisible radiation particles to visible light photons;

means for converting said visible light photons to photoelectrons;

means for light coupling each of said converting means;

means for intensifying said photoelectrons by an average gain factor of substantially $10^4$–$10^7$, said intensifying means being an anti-ion feedback microchannel plate multiplier operated substantially below saturation;

means for displaying said intensified photoelectrons, said displaying means quantitatively indicating spatial position, number, and energy of said single invisible radiation particles.

2. The apparatus of claim 1 wherein said means for converting invisible radiation to visible light is a scintillator material.

3. The apparatus of claim 2 wherein said scintillator material is selected from the group consisting of sodium iodide and cesium iodide.

4. The apparatus of claim 3 wherein said sodium iodide and cesium iodide is impurity activated.

5. The apparatus of claim 4 further including a beryllium window coupled to said scintillator material for preserving said sodium iodide and said cesium iodide.

6. The apparatus of claim 2 wherein said scintillator material is plastic.

7. The apparatus of claim 2 wherein said scintillator material is a rare-earth phosphor.

8. The apparatus of claim 1 wherein said visible light converting means includes a photocathode.

9. The apparatus of claim 1 wherein said light coupling means includes a plurality of fiber optic pipes for guiding said visible light from said invisible radiation converting means to said visible light converting means in substantially the same spatial orientation as said invisible radiation.

10. The apparatus of claim 1 wherein said intensifying means is contained within an evacuated area and said invisible radiation converting means is contained outside said evacuated area.

11. The apparatus of claim 10 wherein said intensifying means includes a single microchannel plate multiplier having a plurality of curved microchannels.

12. The apparatus of claim 10 wherein said intensifying means includes a plurality of single microchannel plate multipliers placed in line to form curved microchannels therethrough.

13. The apparatus of claim 12 wherein said intensifying means includes two single microchannel plate multipliers stacked together to form a chevron configuration of microchannels.

14. The apparatus of claim 12 wherein said intensifying means includes three single microchannel plate multipliers stacked together to form a Z configuration of microchannels.

15. The apparatus of claim 11, 13, or 14 wherein an input face of said microchannel plate multiplier is coated with an oxide film.

16. The apparatus of claim 10 wherein said intensifying means includes an electrostatic focusing lens between said visible light converting means and the input of said intensifying means.

17. The apparatus of claim 10 wherein said intensifying means includes a microchannel plate multiplier having microchannels with conical inputs.

18. The apparatus of claim 1 wherein said intensifying means and said invisible radiation converting means are contained within an evacuated area.

19. The apparatus of claim 1 wherein said displaying means includes:

means for converting said intensified photoelectrons to visible light;

means for guiding said visible light in substantially the same spatial orientation as said invisible radiation particles;

video camera means coupled to said guiding means for receiving said visible light, said video camera means digitizing said visible-light image to record the spatial position, brightness of individual events due to said single incident invisible radiation particle, and number of said invisible radiation particles; and digital information processor means coupled to said video camera means for analysis of brightness or pulse heights of said individual event for determining the energy of said invisible radiation particles.

20. The apparatus of claim 19 wherein said photoelectron converting means is a phosphor screen.

21. The apparatus of claim 19 wherein said guiding means is a plurality of fiber optic light pipes.

22. The apparatus of claim 19 wherein said visible light intensity is proportional to the energy of said invisible radiation particle.

23. The apparatus of claim 1 wherein said displaying means includes:

position-sensing anode means for digitizing said intensified photoelectrons, said anode means indicating the number, position, and pulse height of said intensified photoelectron resulting from said single invisible radiation particles, and means for recording said number, position, and energy of said single radiation particles.

24. The apparatus of claim 23 wherein said position-sensing anode means includes position computing electronics for determining the location of said intensified photoelectrons.

25. The apparatus of claim 24 wherein said position computing electronics computes the centroid of the said intensified photoelectrons and selectively improves the effective spatial resolution of said scintillator material or allows the use of a thicker scintillator material at improved detection efficiencies.

26. The apparatus of claim 25 wherein said recording means includes:

an image monitor connected to said position computing electronics for imaging and counting said invisible radiation particles;

a digital information processor connected to said position computing electronics for processing information received from said position-sensing anode means; and pulse circuitry connected to said position computing electronics for analyzing the pulse height of said intensified photoelectron pulses to determine the energy of said invisible radiation particle.

27. The apparatus of claim 26 wherein said pulse height of said intensified photoelectrons is directly portional to the energy of said invisible radiation particle.

28. The apparatus of claim 27 wherein said position-sensing anode means includes a resistive anode.

29. The apparatus of claim 27 wherein said position sensing anode means includes a cross-grid anode.

30. The apparatus of claim 27 wherein said position sensing anode means includes a quadrant anode.

31. The apparatus of claim 1 further includes means for analyzing said invisible radiation particle within a specified energy region.

32. The apparatus of claim 31 wherein said analyzing means includes a first-stage comprising:
- an input fiber optics plate coupled to said displaying means for receiving radiation therefrom;
- a photocathode adjacent said input fiber optics plate for converting said received radiation to photoelectrons;
- a least one microchannel plate multiplier adjacent to and spaced from said photocathode for intensifying said photoelectrons to a gain factor of $10^4$–$10^7$, said microchannel plate multiplier being operated substantially below saturation;
- a phosphor screen adjacent to and spaced from said microchannel plate multiplier for converting said intensified photoelectrons to visible-light photons;
- an output fiber optics plate coupled between said phosphor screen and said displaying means for guiding said visible-light photons in substantially the same spatial position as said invisible radiation particle;
- pulse circuitry means coupled to a portion of said displaying means for sensing intensified photoelectron pulses of a selected range of pulse heights received from said intensifying means;
- a second-stage comprising an intensifier tube coupled to said displaying means of said first stage, said second-stage intensifier tube including a photocathode and at least one microchannel plate multiplier;
- gate means connected between said pulse circuitry means and said second-stage microchannel plate multiplier, said gate means maintaining said second-stage microchannel plate multiplier negative with respect to said second-stage photocathode until said pulse circuitry senses said selected intensified photoelectron pulse height, and said gate means allowing said second-stage microchannel plate multiplier to go positive with respect to said second-stage photocathode when said pulse circuitry senses said selected intensified photoelectron pulse height;
- whereby said analysis means only conducts and displays when said invisible radiation particles have said selected energy range.

33. A method of counting, imaging and energy resolving of invisible radiation, comprising the steps of:
- converting said invisible light to visible light;
- converting said visible light to photoelectrons;
- coupling said visible light and said photoelectrons so that said photoelectrons maintain the spatial position of said invisible radiation;
- intensifying said photoelectrons by an average gain factor of substantially $10^4$–$10^7$;
- operating an anti-ion feedback microchannel multiplier substantially below saturation; and
- quantitatively displaying the position, number, and pulse height of said intensified photoelectrons.

* * * * *